United States Patent
Ouchi (10) Patent No.: US 9,666,077 B2
(45) Date of Patent: May 30, 2017

(54) COLLISION DETERMINATION DEVICE AND COLLISION DETERMINATION METHOD

(75) Inventor: Yusuke Ouchi, Susono (JP)

(73) Assignee: TOYOTA JIDOSHA KABUSHIKI KAISHA, Toyota-shi, Aichi (JP)

( * ) Notice: Subject to any disclaimer, the term of this patent is extended or adjusted under 35 U.S.C. 154(b) by 0 days.

(21) Appl. No.: 14/425,209

(22) PCT Filed: Sep. 3, 2012

(86) PCT No.: PCT/JP2012/072361
§ 371 (c)(1),
(2), (4) Date: Mar. 17, 2015

(87) PCT Pub. No.: WO2014/033954
PCT Pub. Date: Mar. 6, 2014

(65) Prior Publication Data
US 2015/0206435 A1   Jul. 23, 2015

(51) Int. Cl.
| | |
|---|---|
| *G08G 1/16* | (2006.01) |
| *G01S 13/04* | (2006.01) |
| *G01S 13/86* | (2006.01) |
| *G01S 13/93* | (2006.01) |
| *G06K 9/00* | (2006.01) |

(52) U.S. Cl.
CPC ............. *G08G 1/166* (2013.01); *G01S 13/04* (2013.01); *G01S 13/867* (2013.01); *G01S 13/931* (2013.01); *G06K 9/00805* (2013.01); *G08G 1/165* (2013.01)

(58) Field of Classification Search
None
See application file for complete search history.

(56) References Cited

U.S. PATENT DOCUMENTS

| | | | |
|---|---|---|---|
| 2004/0066285 A1* | 4/2004 | Sekiguchi | B60K 31/0008 340/435 |
| 2007/0050114 A1 | 3/2007 | Koike et al. | |
| 2007/0080850 A1 | 4/2007 | Abe et al. | |
| 2007/0808050 | 4/2007 | Abe et al. | |
| 2009/0135065 A1 | 5/2009 | Tsuchida et al. | |
| 2012/0300078 A1 | 11/2012 | Ogata et al. | |

FOREIGN PATENT DOCUMENTS

| | | |
|---|---|---|
| JP | 2004-117071 A | 4/2004 |
| JP | 2005-084034 A | 3/2005 |
| WO | 2011093160 A1 | 8/2011 |

* cited by examiner

*Primary Examiner* — Adolf DSouza
(74) *Attorney, Agent, or Firm* — Sughrue Mion, PLLC (57) ABSTRACT

A collision determination device includes: a radar detection unit that detects an object around a vehicle using a radar wave; an image detection unit that captures an image of the surroundings of the vehicle and detects the object using the captured image; and a collision determination unit that determines a collision between the vehicle and the object on the basis of a composite target which is generated using a detection result of the radar detection unit and a detection result of the image detection unit. When the object is detected by the radar detection unit and the image detection unit after being detected only by the image detection unit of the radar detection unit and the image detection unit, the collision determination unit performs the collision determination, preferentially using the detection result of the image detection unit over the detection result of the radar detection unit.

10 Claims, 5 Drawing Sheets

COLLISION DETERMINATION DEVICE AND COLLISION DETERMINATION METHOD

CROSS REFERENCE TO RELATED APPLICATIONS

This application is a National Stage of International Application No. PCT/JP2012/072361 filed Sep. 3, 2012, the contents of all of which are incorporated herein by reference in their entirety.

TECHNICAL FIELD

The present invention relates to a collision determination device and a collision determination method that determine a collision between a vehicle and an object.

BACKGROUND ART

As a collision determination device and a collision determination method, for example, a device and method have been known which generate a composite target of an object using the detection result of a radar sensor and the detection result of an image sensor and determine a collision between a vehicle and the object on the basis of the generated composite target, as disclosed in Japanese Unexamined Patent Application Publication No. 2005-84034.

CITATION LIST

Patent Literature

[Patent Literature 1] Japanese Unexamined Patent Application Publication No. 2005-84034

SUMMARY OF INVENTION

Technical Problem

However, in the device and method, when the object is detected by both the sensors after being detected only by the image sensor, it is considered that collision determination is performed on the basis of the detection result of the image sensor and is then performed on the basis of the composite target. In this case, the collision determination is performed, preferentially using the detection result of the radar sensor over the detection result of the image sensor. Therefore, it is considered that the continuity of the collision determination is lost due to a change in the state of the target to be subjected to collision determination and the driver feels discomfort during vehicle driving control, such as a collision avoidance assist operation, which is performed on the basis of the collision determination.

Accordingly, the invention provides a collision determination device and a collision determination method that can maintain the continuity of collision determination even when the state of the target to be subjected to the collision determination is changed.

Solution to Problem

According to an aspect of the invention, there is provided a collision determination device including: a radar detection unit that detects an object around a vehicle using a radar wave; an image detection unit that captures an image of the surroundings of the vehicle and detects the object using the captured image; and a collision determination unit that determines a collision between the vehicle and the object on the basis of a composite target which is generated using a detection result of the radar detection unit and a detection result of the image detection unit. When the object is detected by the radar detection unit and the image detection unit after being detected only by the image detection unit of the radar detection unit and the image detection unit, the collision determination unit performs collision determination, preferentially using the detection result of the image detection unit over the detection result of the radar detection unit.

According to this structure, when the object is detected by the radar detection unit and the image detection unit after being detected only by the image detection unit, the collision determination is performed, preferentially using the detection result of the image detection unit over the detection result of the radar detection unit. Therefore, it is possible to maintain the continuity of the collision determination even when the state of the target to be subjected to the collision determination is changed.

When the object is detected by the radar detection unit and the image detection unit after being detected only by the image detection unit, the collision determination unit may take over the detection result when the object has been detected only by the image detection unit and generate the composite target. According to this structure, since the detection result of the image detection unit is taken over, it is possible to maintain the continuity of the collision determination.

When the object is detected by the radar detection unit and the image detection unit after being detected only by the image detection unit, the collision determination unit may perform the collision determination on the basis of the detection result of the image detection unit, instead of the collision determination based on the composite target. According to this structure, since the collision determination based on the detection result of the image detection unit is continuously performed, it is possible to maintain the continuity of the collision determination.

The collision determination unit may set a composite target with a low threshold value for the object detected only by the image detection unit and set a composite target with a high threshold value, which is set to be greater than the low threshold value, for the object detected by the radar detection unit and the image detection unit. According to this structure, since consistent collision determination is performed on the basis of the composite target, it is possible to maintain the continuity of the collision determination.

The collision determination unit may perform the collision determination for the composite target with a low threshold value, on the basis of a determination threshold value that is less than a determination threshold value of the composite target with a high threshold value. According to this structure, it is possible to perform appropriate collision determination for each type of composite target.

When a possibility of the collision between the vehicle and the object is greater than a predetermined threshold value, the collision determination unit may perform the collision determination, preferentially using the detection result of the image detection unit over the detection result of the radar detection unit.

A detection range of the radar detection unit and a detection range of the image detection unit may partially overlap each other and there may be a area which is not detected by the radar detection unit and is detected by the image detection unit.

The radar detection unit may detect an object in front of the vehicle using the radar wave and the image detection unit may capture an image in front of the vehicle and detect the object using the captured image.

The radar detection unit may detect an object in a traveling direction of the vehicle using the radar wave and the image detection unit may capture an image in the traveling direction of the vehicle and detect the object using the captured image.

The radar detection unit may detect the object in front of the vehicle using a millimeter wave.

According to another aspect of the invention, there is provided a collision determination method including: detecting an object around a vehicle using a radar wave and detecting the object using a captured image of the surroundings of the vehicle; determining a collision between the vehicle and the object on the basis of a composite target which is generated using a detection result of the radar detection and a detection result of the image detection; and determining the collision between the vehicle and the object, preferentially using the detection result of the image detection over the detection result of the radar detection, when the object is detected by the radar detection and the image detection after being detected only by the image detection of the radar detection and the image detection.

Advantageous Effects of Invention

According to the invention, it is possible to provide a collision determination device and a collision determination method which can maintain the continuity of collision determination even when the state of the target to be subjected to the collision determination is changed.

DESCRIPTION OF EMBODIMENTS

Hereinafter, an embodiment of the invention will be described in detail with reference to the accompanying drawings. In the description of the drawings, the same components are denoted by the same reference numerals and the description thereof will not be repeated.

A collision determination device and a collision determination method according to embodiments of the invention which determine a collision with objects around a vehicle, particularly, in front of the vehicle will be described below. However, a collision determination target is not limited to the object in front of the vehicle and the invention can also be applied to an embodiment which determines a collision with an object on the rear side of the vehicle or an object disposed in the traveling direction of the vehicle.

First, the structure of the collision determination device according to the embodiment of the invention will be described with reference to FIGS. 1 and 2. The collision determination device is provided in the vehicle and determines a collision between the vehicle and objects using a radar sensor and an image sensor.

Figure 1:
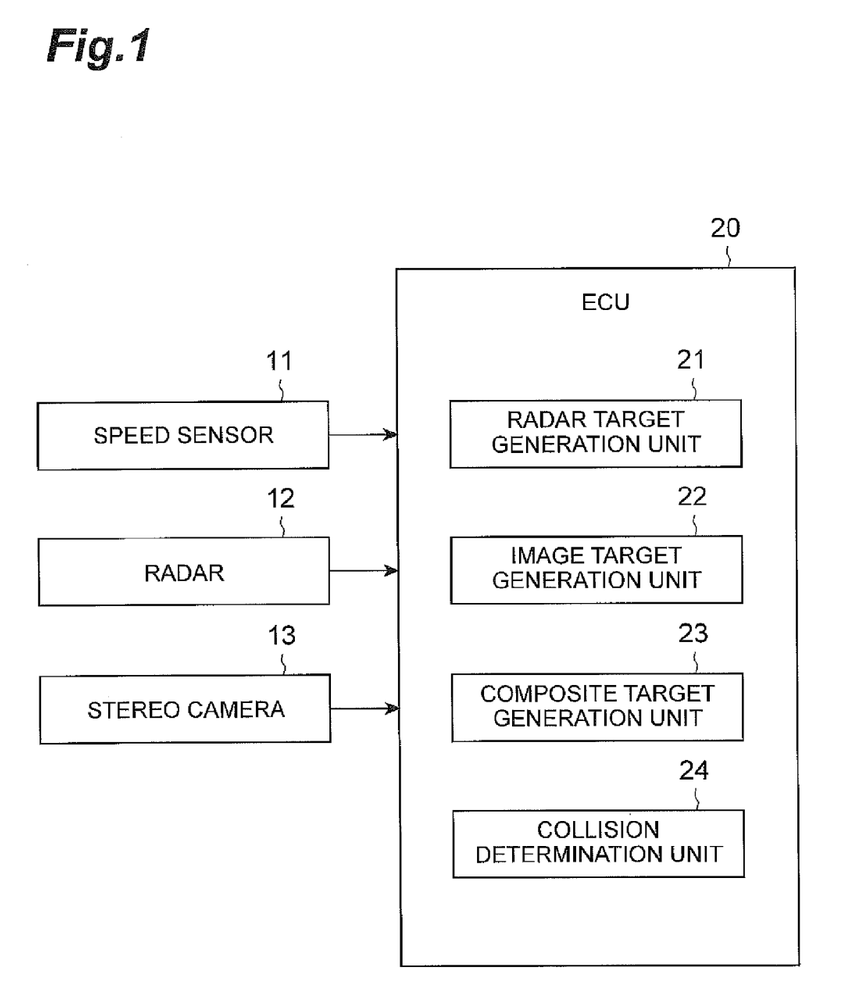
FIG. 1 is a block diagram illustrating the structure of a collision determination device according to an embodiment of the invention.

FIG. 1 is a block diagram illustrating the structure of the collision determination device according to the embodiment of the invention. As shown in FIG. 1, the collision determination device includes a speed sensor 11, a radar 12, a stereo camera 13, and an electronic control unit (ECU) 20.

The speed sensor 11 detects the speed of the vehicle. For example, a wheel speed sensor is used as the speed sensor 11. The speed sensor 11 supplies the detected vehicle speed to the ECU 20.

The radar 12 functions as a radar detection unit (radar sensor) which detects objects around the vehicle, particularly, in front of the vehicle using radar waves, transmits radar waves (electromagnetic waves) in front of the vehicle, and receives radar waves reflected from an object. For example, a microwave radar, a millimeter-wave radar, an ultrasonic radar, or a laser radar is used as the radar 12. The radar 12 supplies radar detection information indicating the detection result of the object to the ECU 20.

The stereo camera 13 functions as an image detection unit (image sensor) which captures an image of the surroundings of the vehicle, particularly, an image in front of the vehicle and detects an object using the captured image. For example, a charge-coupled device (CCD) or a complementary metal-oxide semiconductor (CMOS) sensor is used as the stereo camera 13. The stereo camera 13 includes a plurality of cameras and is provided on the front surface of the vehicle or in the cabin of the vehicle. The stereo camera 13 supplies image detection information indicating the detection result of the object to the ECU 20. A single camera may be used instead of the stereo camera 13.

The ECU 20 includes a radar target generation unit 21, an image target generation unit 22, a composite target generation unit 23, and a collision determination unit 24. The ECU 20 includes, for example, a CPU, a ROM, and a RAM as main components. The CPU executes a program to implement the functions of the radar target generation unit 21, the image target generation unit 22, the composite target generation unit 23, and the collision determination unit 24. The ECU 20 may be a single unit or it may include a plurality of units.

The radar target generation unit 21 generates a radar target on the basis of the radar detection information from the radar 12. The radar target has target information related to the distance to the object and the lateral position of the object which are calculated from the coordinates of the vehicle as a reference.

The target information of the radar target is calculated on the basis of the radar detection information from the radar 12. The distance to the object indicates the distance from the vehicle (radar 12) to the object in the traveling direction of the vehicle and is calculated on the basis of the time from the transmission of the radar wave from the radar 12 to the reception of the radar wave reflected from the object. The lateral position of the object indicates the distance from the vehicle (radar 12) to the object in a direction perpendicular to the traveling direction of the vehicle and is calculated on the basis of the direction (angle) of the radar wave which is reflected from the object and is then received. The lateral position of the radar target is information about the position of the object detected by the radar 12 and does not include information about the width of the object.

The image target generation unit 22 generates an image target on the basis of the image detection information from the stereo camera 13. The image target has target information related to the distance to the object and the lateral position of the object which are calculated from the coordinates of the vehicle as a reference. In addition, the image target generation unit 22 tracks the object on the basis of the image detection information, determines whether the object is in a stationary state, and supplies the tracking result and the determination result of the stationary state to the collision determination unit 24.

The target information of the image target is calculated by the principle of triangulation, on the basis of the deviation between the image detection information items of the left and right cameras forming the stereo camera 13, or is calculated on the basis of the detection size and position of, for example, a number plate of the vehicle in front. The distance to the object indicates the distance from the vehicle (stereo camera 13) to the object in the traveling direction of the vehicle. The lateral position of the object indicates the distance from the vehicle (stereo camera 13) to the object in a direction perpendicular to the traveling direction of the vehicle. The lateral position of the image target also includes the range of the object detected from the image in the lateral direction, that is, information about the width of the object. When the target information is calculated, for example, a process of averaging the calculated values may be performed in order to reduce a calculation error.

The composite target generation unit 23 generates a composite target of the object, using the target information of the radar target and the image target, that is, the detection results of the radar 12 and the stereo camera 13. The composite target is generated by collating the two targets on the basis of the target information of the radar target and the image target. The two targets are collated with each other on the basis of the similarity between the target information items of the two targets, that is, the similarity between the distances to the object and the lateral positions of the object. The composite target has target information related to the distance to the object and the lateral position (including the width) of the object. The target information of the composite target is based on the target information of the radar target and the image target and has higher accuracy than the target information of only the radar target or the target information of only the image target.

Figure 2:
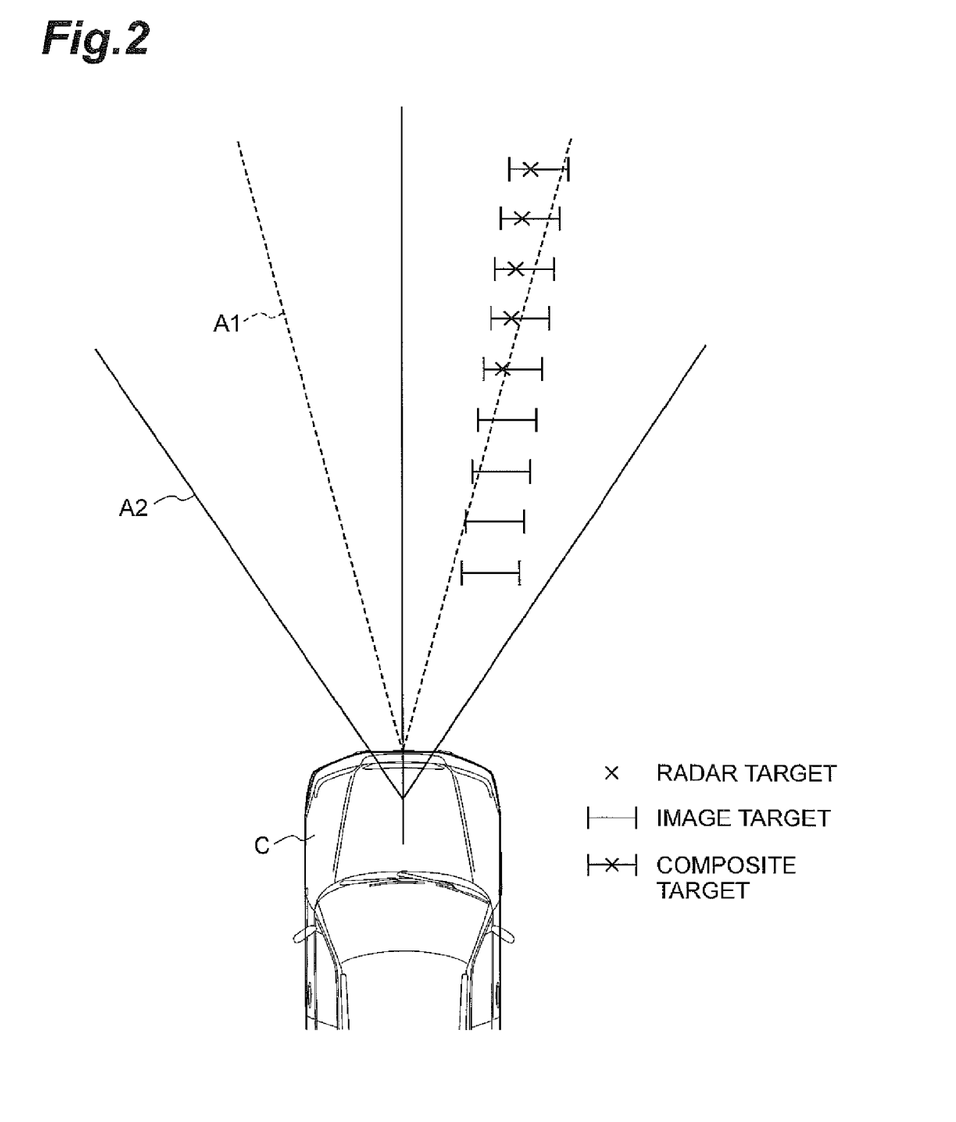
FIG. 2 is a diagram illustrating the detection ranges of a radar and a stereo camera.

FIG. 2 is a diagram illustrating the detection ranges A1 and A2 of the radar 12 and the stereo camera 13. As shown in FIG. 2, the detection range A1 of the radar 12 is narrower than the detection range A2 of the stereo camera 13. Therefore, a area which can be detected only by the stereo camera 13 and which is arranged outside the detection range A1 of the radar 12 is present diagonally in front of the vehicle. As shown in FIG. 2, while an object is present in the detection ranges A1 and A2 of the two sensors 12 and 13, the composite target is generated. However, when the object deviates from the detection range A1 of the radar 12, the composite target is not generated.

Returning to FIG. 1, the collision determination unit 24 calculates collision determination parameters for the radar target, the image target, and the composite target. For example, a target distance, collision probability, existence probability, and a collision lateral position are calculated as the parameters.

The target distance means the distance to the target in the traveling direction of the vehicle. The collision probability means the probability of the vehicle colliding with an object corresponding to a target. The existence probability means the probability that the object corresponding to the target will actually exist. The collision lateral position means a lateral position (the position of the vehicle in the width direction) where the vehicle is expected to collide with the object corresponding to the target. The target distance, the collision probability, the existence probability, and the collision lateral position are calculated on the basis of the moving state of each target. The parameters of each target are stored together with the target information of each target in a memory, such as a RAM, for a predetermined period of time and are read, if necessary.

The collision determination unit 24 determines a collision on the basis of the composite target. When the parameter of the composite target satisfies a predetermined threshold value, the collision determination unit 24 determines the probability of a collision with the object on the basis of whether a collision time is less than a predetermined threshold value. The collision time is calculated by dividing the distance to the object by the relative speed of the object (a variation in the distance to the object per unit time), using the target information of the composite target. For example, the determination result of the collision possibility is used to notify the driver of information or to control the braking or steering of the vehicle to assist collision avoidance.

In addition, the collision determination unit 24 determines a collision on the basis of the image target in a state in which the radar target is not generated and only the image target is generated. The collision determination unit 24 determines the possibility of a collision with the object, on the basis of whether the parameter of the image target satisfies a predetermined threshold value and whether the collision time is less than a threshold value. The collision time is calculated by dividing the distance to the object by the relative speed of the object, using the target information of the image target.

When the object is detected by the radar 12 and the stereo camera 13 after being detected only by the stereo camera 13 of the radar 12 and the stereo camera 13, the collision determination unit 24 determines a collision, preferentially using the detection result of the stereo camera 13 over the detection result of the radar 12. Specifically, when an object is detected by the radar 12 and the stereo camera 13, the collision determination unit 24 takes over the detection result of the stereo camera 13 when the object has been detected only by the stereo camera 13 and sets the composite target. In addition, the collision determination unit 24 sets a composite target with a low threshold value when the object is detected only by the stereo camera 13 and sets a composite target with a high threshold value that is greater than the low threshold value when the object is detected by the radar 12 and the stereo camera 13.

Figure 3:
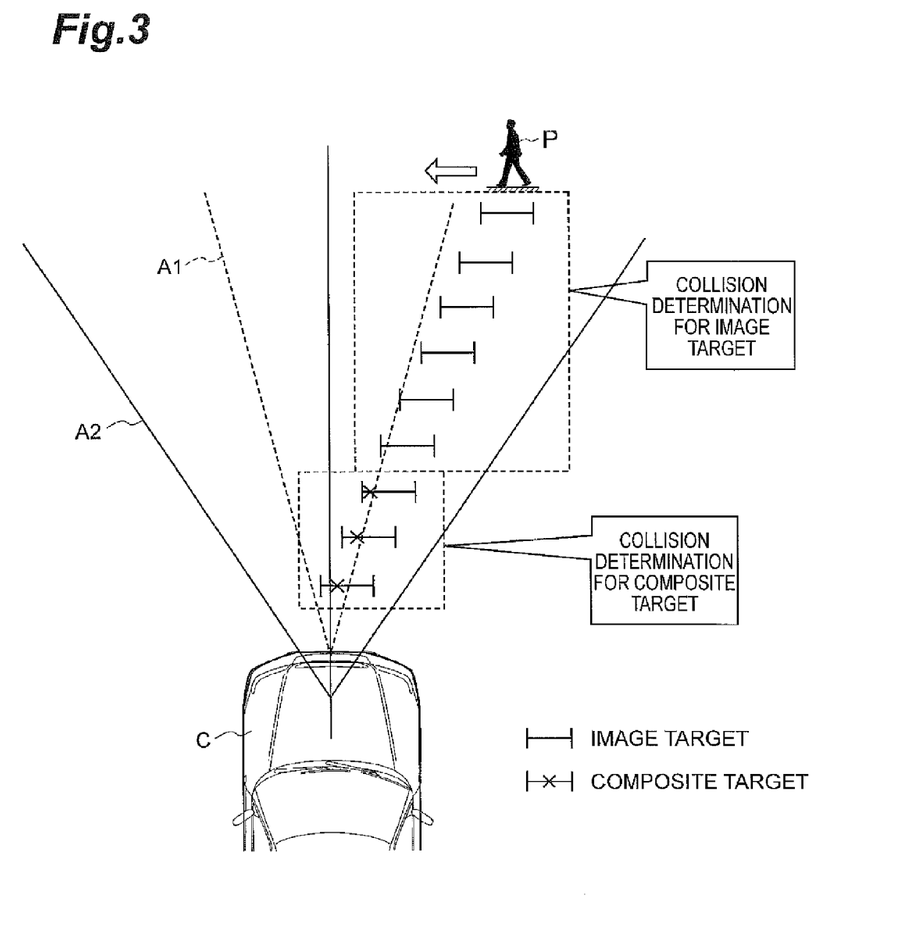
FIG. 3 is a diagram illustrating the state of an assumed collision determination process.

Next, the operation of the collision determination device will be described with reference to FIGS. 3 to 5. First, an assumed collision determination process will be described with reference to FIG. 3. FIG. 3 is a diagram illustrating the state of the assumed collision determination process.

FIG. 3 shows the detection ranges A1 and A2 of the radar 12 and the stereo camera 13 and a variation in the positions of the targets generated by the sensors 12 and 13 in a time series. For example, a pedestrian P who crosses in front of a vehicle C that is traveling is assumed as the target.

In the situation shown in FIG. 3, the object is present outside the detection range A1 of the radar 12 and moves from the detection range A2 of the stereo camera 13 to the detection ranges A1 and A2 of the two sensors 12 and 13. While the object is present outside the detection range A1 of the radar 12 and is moving in the detection range A2 of the stereo camera 13, the image target is generated. When the object moves into the detection ranges A1 and A2 of the two sensors 12 and 13, the composite target is generated using the radar target and the image target.

However, in the collision determination process, it is considered that, when the object is detected by both the sensors 12 and 13 after being detected only by the stereo camera 13, the collision determination is performed on the basis of the image target and is then performed on the basis of the composite target. In this case, the collision determination is performed, preferentially using the information (for example, the collision determination parameter) of the radar target over the information of the image target. That is, the information (for example, the collision determination parameter) of the image target when the object is detected only by the stereo camera 13 is not taken over and a new composite target is set on the basis of the information of the radar target. Therefore, the continuity of the collision determination is lost due to a change in the state of the target to be subjected to collision determination and the driver is likely to feel discomfort during vehicle driving control, such as a collision avoidance assist operation, which is performed on the basis of the collision determination.

Next, the operation of the collision determination device will be described with reference to FIGS. 4 and 5. FIG. 4 is a flowchart illustrating the operation of the collision determination device. FIG. 5 is a diagram illustrating the state of the collision determination process shown in FIG. 4.

Figure 4:
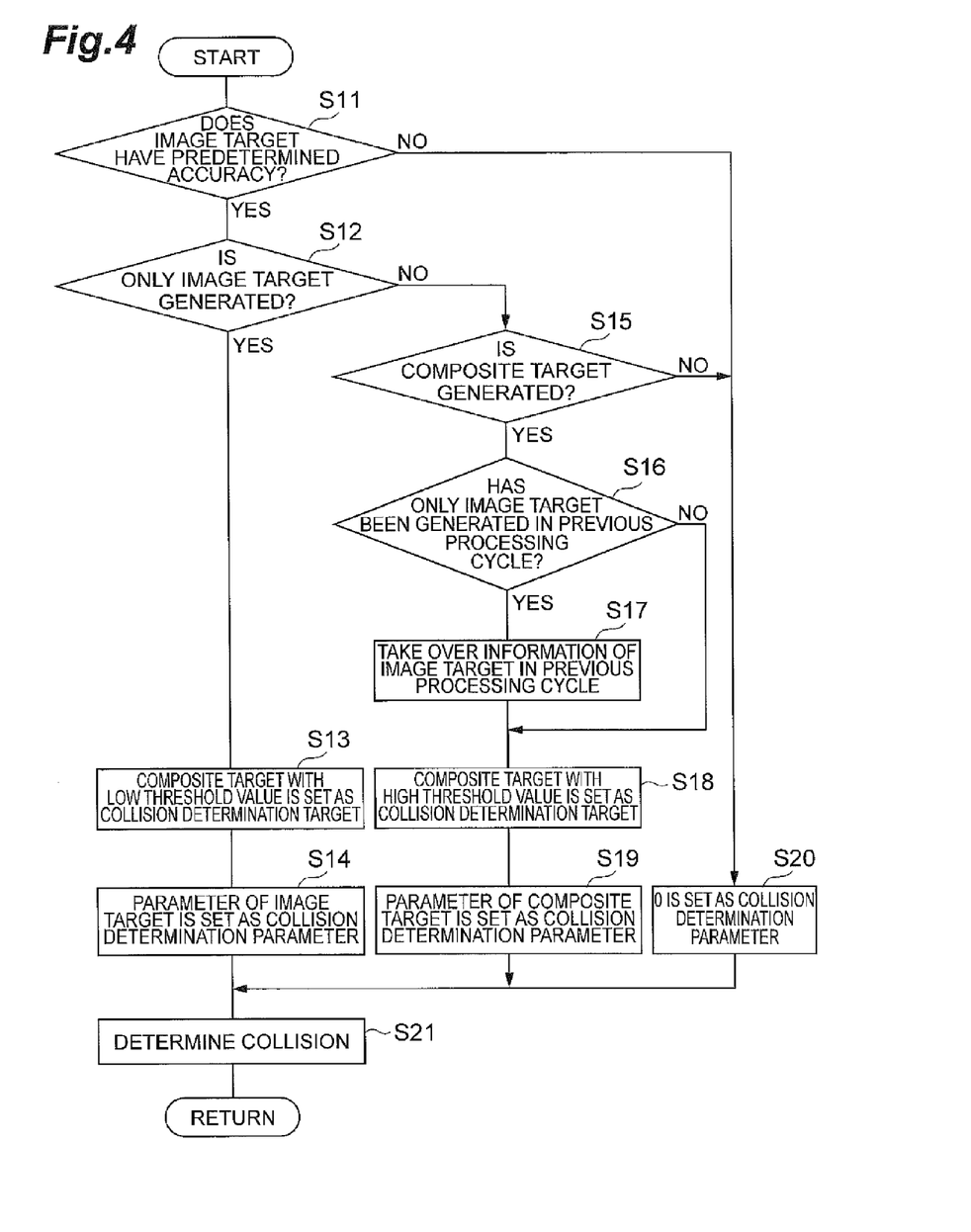
FIG. 4 is a flowchart illustrating the operation of the collision determination device.

The collision determination device repeatedly performs the process shown in FIG. 4 for each processing cycle. The collision determination device performs the following process before performing the process shown in FIG. 4. That is, the radar target generation unit 21 generates a radar target when an object is present in the detection range of the radar 12. The image target generation unit 22 generates an image target when an object is present in the detection range of the stereo camera 13. The composite target generation unit 23 generates a composite target when the radar target and the image target are collated with each other. The collision determination unit 24 calculates collision determination parameters for the radar target, the image target, and the composite target according to the generation state of the targets.

After the above-mentioned process is performed, the collision determination unit 24 determines whether the image target has a predetermined accuracy (S11). In this determination process, for example, the reliability of a collision lateral position is determined as the collision determination parameter of the image target. The collision lateral position means a lateral position (the position of the vehicle in the width direction) where the vehicle is expected to collide with the image target. The reliability (the degree of certainty) is calculated on the basis of, for example, a change in the collision lateral position in the previous processing cycle.

When it is determined that the image target has the predetermined accuracy, the collision determination unit 24 determines whether the object is detected only by the stereo camera 13, that is, whether only the image target is generated (S12). When it is determined that only the image target is detected, the collision determination unit 24 sets a composite target with a low threshold value as a collision determination target (S13).

The composite target with a low threshold value means a composite target which is generated using only the image target and a threshold value less than the threshold value of a general composite target (a composite target with a high threshold value which will be described below) is set as a determination threshold value used for the collision determination. In this case, the collision determination unit 24 sets the parameter of the image target as the collision determination parameter (S14).

When it is determined in S12 that only the image target is not determined, the collision determination unit 24 determines whether the object is detected by the radar 12 and the stereo camera 13, that is, whether the composite target is generated (S15).

When it is determined that the composite target is generated, the collision determination unit 24 determines whether only the image target has been generated in the previous processing cycle (S16). When it is determined that only the image target has been generated, this means that the object is detected by both the sensors 12 and 13 after being detected by the stereo camera 13.

In this case, the collision determination unit 24 performs collision determination, preferentially using the information (for example, the collision determination parameter) of the image target over the information of the radar target. Therefore, the collision determination unit 24 takes over the information of the image target when only the image target has been generated, that is, the information of the composite target with a low threshold value in the previous processing cycle as the information of the composite target (a composite target with a high threshold value which will be described) (S17).

When it is determined in S15 that the composite target is generated, the collision determination unit 24 sets the composite target with a high threshold value as a collision determination target, regardless of whether only the image target has been generated in the previous processing cycle (S18).

The composite target with a high threshold value is a general composite target which is generated using the radar target and the image target and has higher accuracy than the composite target with a low threshold value. In this case, the collision determination unit 24 sets the parameter of the composite target as the collision determination parameter (S19).

When the information of the image target in the previous processing cycle is taken over in S17, a new composite target with a high threshold value is set on the basis of the information of the image target calculated in the previous processing cycle. That is, a new composite target is set preferentially using the information (for example, the collision determination parameter) of the image target over the information of the radar target. In the subsequent process, the taken-over information is updated to calculate the parameter of the composite target with a high threshold value.

When it is determined in S11 that the image target does not have the predetermined accuracy or when it is determined in S15 that the composite target is not generated, the collision determination based on the image target is not appropriately performed. Therefore, the collision determination unit 24 sets 0 as the collision determination parameter (S20).

In S14, S19, or S20, when the collision determination parameter is set, the collision determination unit 24 performs the collision determination on the basis of the set parameter. Specifically, the collision determination unit 24 determines whether the collision determination parameter satisfies a predetermined threshold value. When it is determined that the collision determination parameter satisfies the predetermined threshold value, the collision determination unit 24 determines whether the collision time is less than a determination threshold value.

When the collision possibility is determined on the basis of the composite target with a high threshold value, the collision determination unit 24 calculates the collision time using the target information of the composite target and compares the collision time with a general determination threshold value. On the other hand, when the collision possibility is determined on the basis of the composite target with a low threshold value, the collision determination unit 24 calculates the collision time using the target information of the image target and compares the collision time with a determination threshold value less than the general determination threshold value.

In the above-mentioned flowchart, the collision determination based on the image target is performed on the basis of whether the image target has the predetermined accuracy in S11. However, instead of the process or in addition to the process, it may be determined whether the possibility of the collision between the vehicle and the object is greater than a predetermined threshold value and the collision determination based on the image target may be performed when the collision possibility is greater than the threshold value. In this case, for example, the collision possibility is determined on the basis of whether the collision determination parameter of the image target satisfies a predetermined threshold value.

Figure 5:
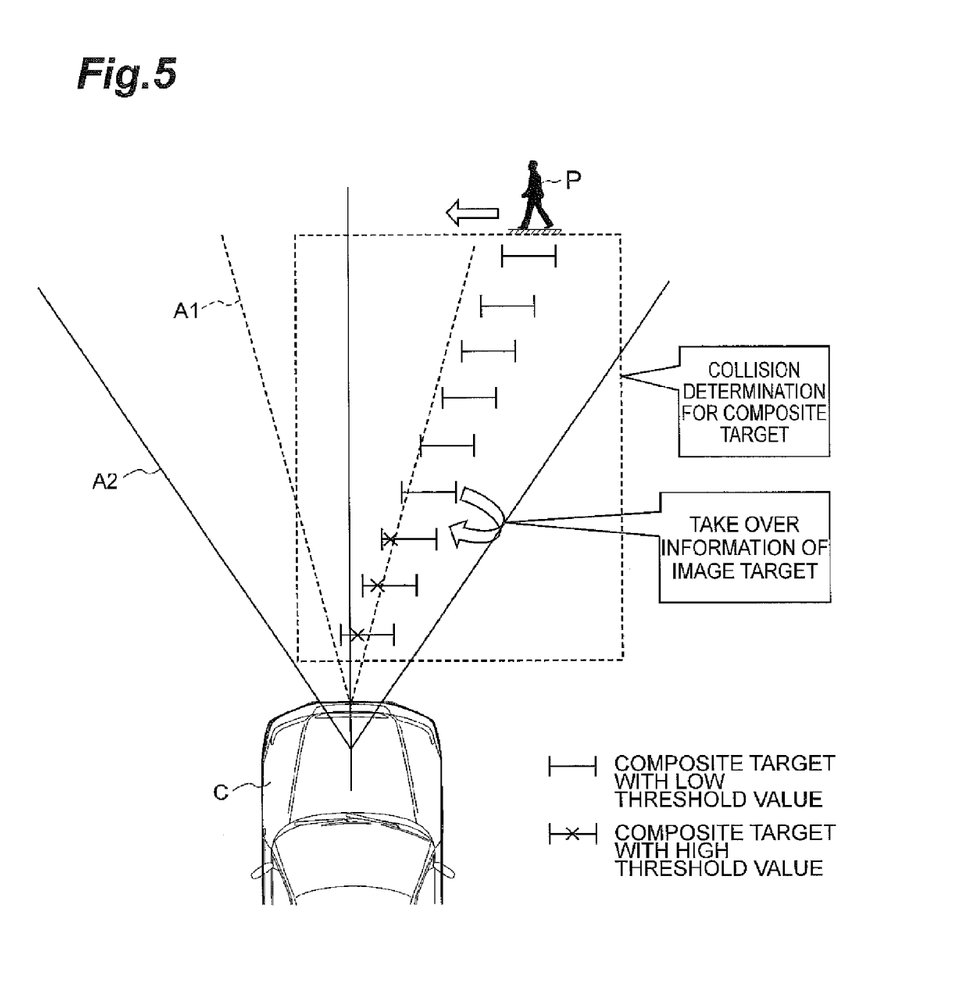
FIG. 5 is a diagram illustrating the state of the collision determination process shown in FIG. 4.

FIG. 5 shows a change in the position of the target in the collision determination process shown in FIG. 4 in a time series, as contrasted with FIG. 3. In the collision determination process shown in FIG. 4, when the object is detected by both the sensors 12 and 13 after being detected only by the stereo camera 13, the collision determination is performed on the basis of the composite target with a low threshold value and is then performed on the basis of the composite target with a high threshold value. In this case, the collision determination based on the composite target with a high threshold value takes over the information (for example, the collision determination parameter) of the image target when the object has been detected only by the stereo camera 13 and the composite target with a high threshold value is set preferentially using the information of the image target over the information of the radar target. The collision determination is continuously performed on the basis of the information of the image target. Therefore, even when the state of the target to be subjected to the collision determination is changed, it is possible to maintain the continuity of the collision determination. As a result, the driver does not feel discomfort during vehicle driving control such as a collision avoidance assist operation which is performed on the basis of the collision determination.

As described above, in the collision determination device according to the embodiment of the invention, when the object is detected by the radar 12 and the stereo camera 13 after being detected only by the stereo camera 13 of the radar 12 and the stereo camera 13, the collision determination is performed, preferentially using the detection result of the stereo camera 13 over the detection result of the radar 12. Therefore, even when the state of the target to be subjected to the collision determination is changed, it is possible to maintain the continuity of the collision determination.

When the object is detected by the radar 12 and the stereo camera 13 after being detected only by the stereo camera 13, the collision determination device may take over the detection result obtained when the object has been detected only by the stereo camera 13, generate the composite target, and take over the detection result of the stereo camera 13.

When the object is detected by the radar 12 and the stereo camera 13 after being detected only by the stereo camera 13, the collision determination device may perform collision determination based on the detection result of the stereo camera 13, instead of the collision determination based on the composite target.

The collision determination device may generate the composite target with a low threshold value for the object which is detected only by the stereo camera 13, generate the composite target with a high threshold value which is set to be greater than the low threshold value for the object detected by the radar 12 and the stereo camera 13, and perform consistent collision determination on the basis of the composite target.

The collision determination device may perform the collision determination for the composite target with a low threshold value, on the basis of a determination threshold value that is less than the determination threshold value of the composite target with a high threshold value and perform appropriate collision determination for each type of composite target.

When the possibility of the collision between the vehicle and the object is greater than a predetermined threshold value, the collision determination may be performed, preferentially using the detection result of the stereo camera 13 over the detection result of the radar 12.

The detection range of the radar 12 and the detection range of the stereo camera 13 may partially overlap each other and there may be a area which is not detected by the radar 12 and is detected by the stereo camera 13.

The radar 12 may detect objects in front of the vehicle using radar waves and the stereo camera 13 may capture an image in front of the vehicle and detect objects using the captured image.

The radar 12 may detect objects in the traveling direction of the vehicle using radar waves and the stereo camera 13 may capture an image in the traveling direction of the vehicle and detect objects using the captured image.

The radar 12 may detect objects in front of the vehicle using millimeter waves.

The above-described embodiment is the preferred embodiment of the collision determination device and the collision determination method according to the invention. However, the collision determination device and the collision determination method according to the invention are not limited to those described in the embodiment. The collision determination device and the collision determination method according to the invention may be modified without departing from the scope and spirit of the invention described in the claims or they may be applied to other techniques.

For example, in the above-described embodiment, the functions of the radar target generation unit 21 and the image target generation unit 22 are implemented by the ECU 20. However, the function of the radar target generation unit 21 may be implemented by an independent ECU, for example, an ECU for a radar sensor and the function of the image target generation unit 22 may be implemented by an independent ECU, for example, an ECU for an image sensor.

In the description of the embodiment, the detection ranges A1 and A2 of the radar 12 and the stereo camera 13 are symmetric with respect to the traveling direction of the vehicle and symmetrically overlap each other. However, the detection ranges A1 and A2 of the two sensors 12 and 13 may partially overlap each other and there may be a area which is not detected by the radar 12 and is detected by the stereo camera 13. The detection ranges A1 and A2 are not necessarily symmetric with respect to the traveling direction of the vehicle and do not necessarily symmetrically overlap each other.

In the above-described embodiment, when the object is detected by both the sensors 12 and 13 after being detected only by the stereo camera 13, the collision determination is performed on the basis of the image target and is then performed on the basis of the composite target. However, after collision determination is performed on the image target, collision determination based on the image target (that is, based on the detection result of the stereo camera 13) may be performed instead of the collision determination based on the composite target. In this case, since the collision determination based on the image target is continuously performed, it is possible to maintain the continuity of the collision determination.

The collision determination device and the collision determination method according to the embodiment of the invention which determine a collision with objects around the vehicle, particularly, in front of the vehicle have been described above. However, as described above, the detection position is not limited to the front side of the vehicle and the invention can also be applied to an embodiment which determines a collision with an object on the rear side of the vehicle or an object in the traveling direction of the vehicle.

In this case, for example, two sets of the radar sensor and the image sensor which detect objects on the rear side of the vehicle, and detect objects in front of the vehicle and objects on the rear side of the vehicle respectively can be used to determine a collision with an object on the rear side of the vehicle. In addition, the radar sensor and the image sensor can be used to determine a collision with an object in the traveling direction of the vehicle according to whether the vehicle moves forward or backward.

REFERENCE SIGNS LIST

11: SPEED SENSOR
12: RADAR
13: STEREO CAMERA
20: ECU
21: RADAR TARGET GENERATION UNIT
22: IMAGE TARGET GENERATION UNIT
23: COMPOSITE TARGET GENERATION UNIT
24: COLLISION DETERMINATION UNIT

The invention claimed is:

1. A collision determination device that cyclically performs a predetermined process, comprising:
a radar detection unit that detects an object around a vehicle using a radar wave;
an image detection unit that captures an image of the surroundings of the vehicle and detects the object using the captured image; and
a collision determination unit that predicts a collision between the vehicle and the object on the basis of a composite target which is generated using a detection result of the radar detection unit and a detection result of the image detection unit,
wherein, if the object has been detected by both the radar detection unit and the image detection unit, and if the object has been detected by the image detection unit and not the radar detection unit in an immediately preceding processing cycle, the collision determination unit sets the composite target using the detection result of the image detection unit of the immediately preceding processing cycle.

2. The collision determination device according to claim 1,
wherein, when the object is detected by both the radar detection unit and the image detection unit after the object has been detected by only the image detection unit, the collision determination unit performs the collision determination on the basis of the detection result of the image detection unit, instead of the collision determination based on the composite target.

3. The collision determination device according to claim 1,
wherein the collision determination unit sets a composite target with a low threshold value for the object detected only by the image detection unit and sets a composite target with a high threshold value, which is set to be greater than the low threshold value, for the object detected by the radar detection unit and the image detection unit.

4. The collision determination device according to claim 3,
wherein the collision determination unit performs the collision determination for the composite target with the low threshold value, on the basis of a determination threshold value that is less than a determination threshold value of the composite target with the high threshold value.

5. The collision determination device according to claim 1,
wherein, when a possibility of the collision between the vehicle and the object is greater than a predetermined threshold value, the collision determination unit performs the collision determination, preferentially using the detection result of the image detection unit over the detection result of the radar detection unit.

6. The collision determination device according to claim 1,
wherein a detection range of the radar detection unit and a detection range of the image detection unit are partially different from each other, and there is an area which is not detected by the radar detection unit and is detected by the image detection unit.

7. The collision determination device according to claim 1,
wherein the radar detection unit detects an object in front of the vehicle using the radar wave, and the image detection unit captures an image in front of the vehicle and detects the object using the captured image.

8. The collision determination device according to claim 1,
wherein the radar detection unit detects an object in a traveling direction of the vehicle using the radar wave, and the image detection unit captures an image in the traveling direction of the vehicle and detects the object using the captured image.

9. The collision determination device according to claim 1,
wherein the radar detection unit detects the object around the vehicle using a millimeter wave.

10. A collision determination method that cyclically performs a predetermined process, comprising:
detecting an object around a vehicle using a radar wave and detecting the object using a captured image of the surroundings of the vehicle;
predicting a collision between the vehicle and the object on the basis of a composite target which is generated using a detection result of the radar detection and a detection result of the image detection; and when the object has been detected by both the radar detection and the image detection after the object has been detected by only the image detection and not the radar detection in an immediately preceding processing cycle, setting the composting target using the detection result of the image detection of the immediately preceding processing cycle.

\* \* \* \* \*